United States Patent
Lee

(10) Patent No.: US 8,981,268 B2
(45) Date of Patent: Mar. 17, 2015

(54) APPARATUS FOR RECOVERING VALUABLE ELEMENTS

(75) Inventor: Joon Ho Lee, Seongnam-Si (KR)

(73) Assignee: Korea University Research and Business Foundation (KR)

( * ) Notice: Subject to any disclaimer, the term of this patent is extended or adjusted under 35 U.S.C. 154(b) by 140 days.

(21) Appl. No.: 12/891,005

(22) Filed: Sep. 27, 2010

(65) Prior Publication Data

US 2011/0100982 A1    May 5, 2011

(30) Foreign Application Priority Data

Oct. 30, 2009    (KR) .................. 10-2009-0104582

(51) Int. Cl.
*H05B 6/64*     (2006.01)
*B09B 3/00*     (2006.01)
*C22B 7/00*     (2006.01)

(52) U.S. Cl.
CPC ........................... *C22B 7/001* (2013.01)
USPC ............................. 219/679; 219/700; 588/249

(58) Field of Classification Search
CPC ............................................ C22B 7/001
USPC ......... 219/679, 678, 756, 762, 775, 690, 695, 219/680, 759; 422/21, 22, 23, 26; 156/345.41, 345.42, 345.36; 241/23, 241/606; 588/212; 373/142
See application file for complete search history.

(56) References Cited

U.S. PATENT DOCUMENTS

| | | | |
|---|---|---|---|
| 3,674,504 A * | 7/1972 | Lane ............................... | 426/243 |
| 5,487,873 A * | 1/1996 | Bridges et al. ................ | 588/249 |
| 7,227,882 B2 | 6/2007 | Schaefer | |
| 2002/0093123 A1* | 7/2002 | Miura et al. ................... | 264/432 |
| 2003/0057205 A1* | 3/2003 | Minobe et al. ................ | 219/700 |
| 2006/0090424 A1* | 5/2006 | Tokarz et al. ................... | 53/448 |

FOREIGN PATENT DOCUMENTS

| | | |
|---|---|---|
| JP | 2002310566 A | 10/2002 |
| JP | 2003-103249 A | 4/2003 |
| JP | 2006348367 A | 12/2006 |
| JP | 2008175517 A | 7/2008 |
| KR | 20010007708 A | 2/2001 |

* cited by examiner

*Primary Examiner* — Quang Van
(74) *Attorney, Agent, or Firm* — Lerner, David, Littenberg, Krumholz & Mentlik, LLP

(57) ABSTRACT

An apparatus for recovering valuable elements is provided herein. In some embodiments, the apparatus having a conveyor; a container configured to be moved on the conveyor, wherein the container has an open surface; a paper package which contains a mixture containing valuable elements, the paper package being configured to be disposed in the container and to be combusted; a cover that covers the open surface of the container, the cover having an opening for discharging valuable elements vaporized from the mixture; a microwave oven through which the container having the cover and the paper package passes, wherein the microwave oven having a microwave generator and a discharging opening for discharging the valuable elements vaporized from the mixture; and a condenser coupled to the discharge opening, wherein the condenser recovers the valuable elements vaporized from the mixture.

7 Claims, 3 Drawing Sheets

APPARATUS FOR RECOVERING VALUABLE ELEMENTS

CROSS-REFERENCE TO RELATED APPLICATION

This application claims priority to and the benefit of Korean Patent Application No. 10-2009-0104582 filed in the Korean Intellectual Property Office on Oct. 30, 2009, the entire contents of which are incorporated herein by reference.

BACKGROUND OF THE INVENTION (a) Field of the Invention

The present invention relates to an apparatus for recovering valuable elements. More particularly, the present invention relates to an apparatus for recovering valuable elements such as zinc, iron, and so on from waste discharged from an iron making plant such as iron dust, sludge, slag and so on.

(b) Description of the Related Art

A large amount of waste such as dust, sludge, slag, and scales are generated in an iron making plant in which molten iron is manufactured by reducing iron ore. The waste contains a large amount of metals such as iron and zinc and valuable elements such as phosphor. Research and development have been vigorously conducted for recycling the metals among the elements and using them as a resource for manufacturing molten iron.

Most of the waste such as dust, sludge, slag, scales, and so on is easily e scattered since they exist as powders. Therefore, it is necessary to heat the waste without scattering them in order to recover the metals contained in the waste by heating and reducing the waste. For this, a method for heating them by using a microwave has been used. The waste is not scattered since it can be heated in a stationary state by using the above method.

SUMMARY OF THE INVENTION

An apparatus for recovering valuable elements containing metals such as zinc, iron and so on by using microwave is provided.

An exemplary embodiment of the present invention provides an apparatus for recovering valuable elements, including: i) a conveyor; ii) a microwave oven that is located on the conveyor and that radiates microwaves; iii) a container of which a surface is opened; and iv) a cover that covers the surface of the container. The container passes through the microwave oven while being moved on the conveyor, and is configured to contain a mixture containing carbonaceous materials and waste discharged from an iron making plant therein. The microwave oven includes a casing that blocks the microwaves from the outside. The casing includes i) a lower portion that is opened to be opposed to the conveyor, and ii) an upper portion on which a discharging opening for discharging metal vaporized from the mixture is formed. The upper portion opposes the lower portion. The valuable elements contained in the mixture are configured to be recovered by heating the mixture by the microwaves.

The width of the container may be less than the height of the container. A ratio of the width of the container to the height of the container may be in a range of 5 to 20.

The apparatus for recovering valuable elements according to an embodiment of the present invention may further include a packaging device that neighbors the conveyor and supplies the mixture to the container after packaging the mixture. The container, before passing by the microwave oven, may contain the mixture packaged in a package made of paper. The apparatus for recovering valuable elements according to an embodiment of the present invention may further include a mixture supplying device that supplies the carbonaceous materials and the waste discharged from the iron making plant to the packing device after mixing the carbonaceous materials and the waste discharged from the iron making plant.

The apparatus for recovering valuable elements according to an embodiment of the present invention may further include a plurality of fans that are installed at a side portion of the casing to be spaced apart from each other along a transferring direction of the conveyor. The conveyor may include i) a pair of driving motors that are spaced apart from each other, and ii) a conveyor belt that is combined with the pair of the driving motors and that is configured to move the container. A plurality of depressions may be formed on the conveyor belt side by side along a transferring direction of the conveyor belt, and into which the container is inserted to be fixed. The apparatus for recovering valuable elements according to an embodiment of the present invention may further include a magnetic separator that neighbors the conveyor and that is configured to recover valuable elements contained in the container that passed through the microwave oven.

A recovery ratio of the metals such as zinc, iron, and so on can therefore be raised. The iron can be easily separated from the slag by using microwaves when zinc, iron, and so on are recovered.

In some embodiments, an apparatus for recovering valuable elements comprises a conveyor; a container configured to be moved on the conveyor, wherein the container has an open surface; a paper package which contains a mixture containing valuable elements, the paper package being configured to be disposed in the container and to be combusted; a cover that covers the open surface of the container, the cover having an opening for discharging valuable elements vaporized from the mixture; a microwave oven through which the container having the cover and paper package passes, wherein the microwave oven comprises a microwave generator and a discharging opening for discharging the valuable elements vaporized from the mixture; and a condenser coupled to the discharge opening, wherein the condenser recovers the valuable elements vaporized from the mixture; wherein the width of the container is greater than the height of the container, and wherein a ratio of the width of the container to the height of the container is in a range of 5 to 20.

In some embodiments, the apparatus further comprises a packaging device that neighbors the conveyor and is configured to package the mixture in the paper package and to supply the paper package containing the mixture to the container.

In some embodiments, the apparatus further comprises a mixture supplying device configured to supply the mixture to a packing device.

In some embodiments, the microwave oven further comprises a plurality of fans spaced apart from each other along a transferring direction of the conveyor.

In some embodiments, the conveyor comprises a pair of driving motors that are spaced apart from each other; and a conveyor belt driven by the pair of the driving motors and is configured to move the container, wherein a plurality of depressions are formed on the conveyor belt side by side along a transferring direction of the conveyor belt, wherein the container is configured to be inserted into one of the plurality of depressions.

In some embodiments, the apparatus further comprises a magnetic separator that neighbors the conveyor, wherein the magnetic separator is configured to recover valuable elements contained in the container after the container passes through the microwave oven.

In some embodiments, the valuable elements are selected from the group consisting of zinc, iron, and phosphor.

DETAILED DESCRIPTION OF THE EMBODIMENTS

Figure 1:
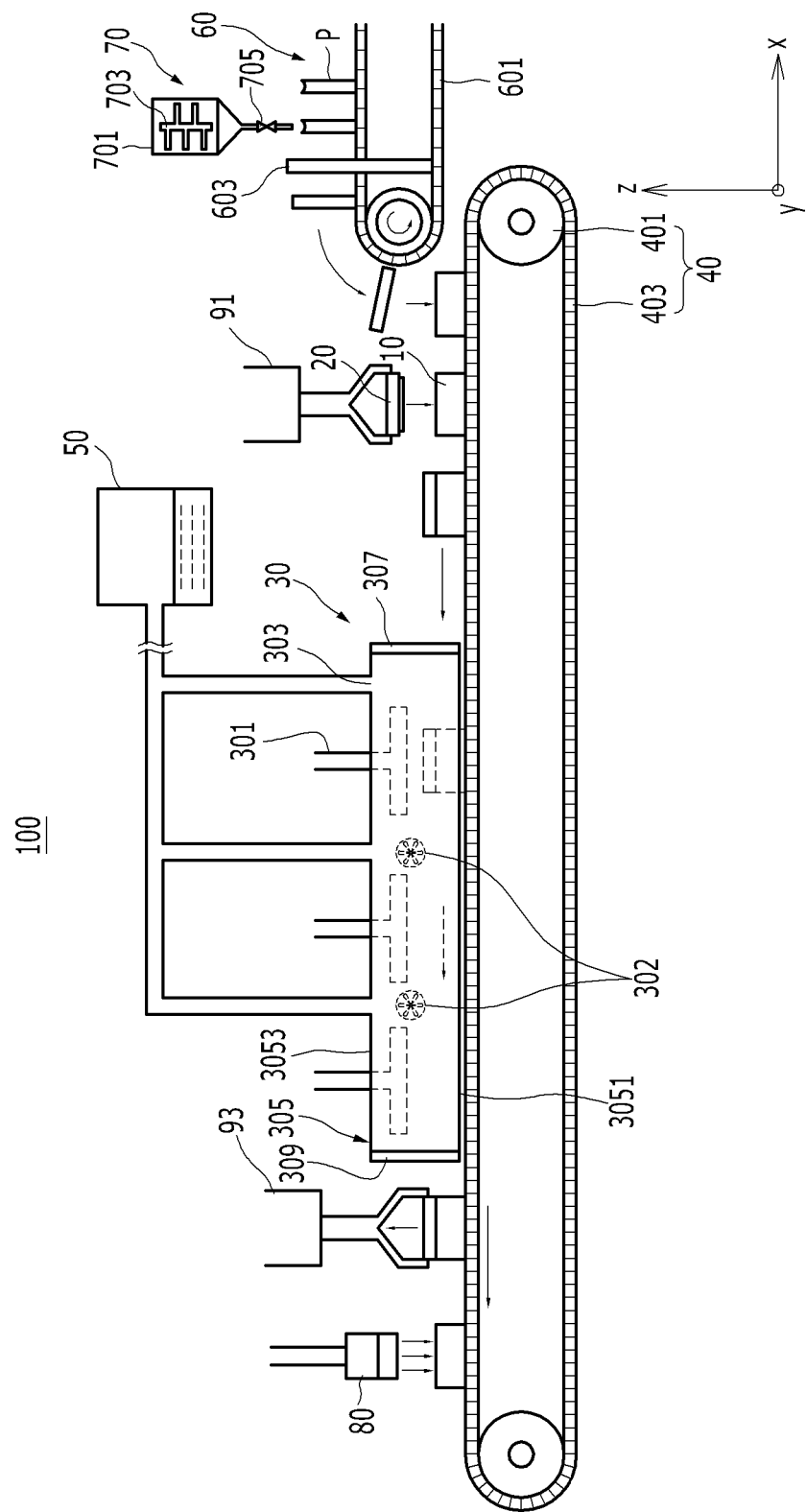
FIG. 1 is a schematic view of an apparatus for recovering valuable elements according to a first embodiment of the present invention.

The embodiments of the present invention described with reference to perspective views and sectional views substantially represent the ideal embodiments of the present invention. Consequently, illustrations are expected to be variously modified, that is, manufacturing methods and/or specifications are expected to be modified. Thus, the embodiments are not limited to a particular form of illustrated regions and, for example, modifications of forms according to manufacturing are also included. For example, a region illustrated or described to be flat may generally be rough or have rough and nonlinear characteristics. Also, a portion illustrated to have a pointed angle may be rounded. Thus, regions illustrated in the drawings are merely rough and broad, and their forms are not meant to be precisely illustrated or meant to narrow the scope of the present invention.

The technical terms used herein are to simply mention a particular embodiment and are not meant to limit the present invention. An expression used in the singular encompasses the expression of the plural, unless it has a clearly different meaning in the context. In the present invention, it is to be understood that the terms such as "including", "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that when an element is referred to as being "on" another element, it can be directly on the other element or intervening elements may also be present. In contrast, when an element is referred to as being "directly on" another element, there are no intervening elements present.

The terms "first", "second", and "third" are used to explain various parts, components, regions, layers and/or sections, but it should be understood that they are not limited thereto. These terms are used only to discriminate one portion, component, region, layer, or section from another portion, component, region, layer, or section. Thus, a first portion, component, region, layer, or section may be referred to as a second portion, component, region, layer, or section without departing from the scope of the present invention.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have idealized or excessively formal meanings unless clearly defined in the present application.

Terms indicating relative spaces such as "below", "above", and the like may be used to easily describe the relationships between elements illustrated in drawings. Such terms may be intended to include different meanings or operations of a device in use along with meanings intended by the drawings. For example, if a device on a drawing is reversed, it would be described that one element described to be "under" or "below" the other element may be described to be "on" or "above" the other element. Thus, terms illustrative of "under" or "below" may include all the downward and upward directions. A device may be rotated by 90° or other angles, and terms representing a relative space may be interpreted accordingly.

The term "carbonaceous material" used below means all materials containing carbon. Therefore, the carbonaceous material is interpreted as carbon, black carbon, waste carbon, fine coal, coke, or coal. The term "valuable elements" used below means all elements disclosed in the periodic table and compounds thereof. Therefore, the valuable elements are interpreted to include all elements capable of being recovered and recycled, and compounds thereof.

"Waste of an iron making plant" used below includes the waste discharged from the iron making plant. The term "waste" means all by-products discharged from the iron making plant such as dust, wasted carbon, wasted cokes, slag, and so on. Furthermore, the waste of an iron making plant is interpreted to include all waste that is expected to be discharged from the iron making plant among the waste.

FIG. 1 schematically shows the apparatus for recovering valuable elements 100 according to an embodiment of the present invention. The apparatus for recovering valuable elements 100 of FIG. 1 is merely to illustrate the present invention, and the present invention is not limited thereto. Therefore, the apparatus for recovering valuable elements 100 of FIG. 1 can have other forms. In addition, since a detailed operating structure of the apparatus for recovering valuable elements 100 of FIG. 1 can be understood by those skilled in the art in a technical field of the present invention, detailed description thereof is omitted.

As shown in FIG. 1, the apparatus for recovering valuable elements 100 includes a container 10, a cover 20, a microwave oven 30, and a conveyor 40. The apparatus for recovering valuable elements 100 further includes a condenser 50, a packaging device 60, a mixture supplying device 70, and a magnetic separator 80. The devices described above may be partially omitted. In addition, the apparatus for recovering valuable elements 100 may further include other devices if necessary. A process for recovering valuable elements by using the apparatus for recovering valuable elements 100 will be explained below along a flow direction of the conveyor 40 indicated by an arrow, that is, the −x axis direction.

Firstly, the mixture supplying device 70 stirs and mixes the carbonaceous material and the waste of the iron making plant. Slag can be additionally mixed with the carbonaceous material and the iron dust. The mixture supplying device 70 includes a mixing bin 701 and a mixer 703. The carbonaceous material and the waste discharged from the iron making plant charged into the mixing bin 701 are uniformly mixed with each other by the rotating mixer 703. Since a detailed specific structure of the mixture supplying device 70 can be easily understood by those skilled in the art in a technical field of the present invention, a detailed description thereof is omitted.

Materials containing carbon that are recovered from the iron making plant such as waste carbon, fine coal, coke, and coal, may be used as the carbonaceous material. Meanwhile, the iron dust is recovered by collecting fine particles generated from the iron making plant, and an exemplary composition thereof is described in Table 1 below. In addition, an exemplary composition of the iron making slag generated from the iron making plant is described in Table 2 below. Furthermore, various wastes containing valuable elements such as sludge and mill scales generated from the iron making plant can be used as a resource.

TABLE 1

| | Elements | | | | | | | | | | |
|---|---|---|---|---|---|---|---|---|---|---|---|
| | Al | Ca | Fe | K | Mg | Na | Pb | Cr | S | Zn | Si |
| content (wt %) | 0.2026 | 2.738 | 25.17 | 2.422 | 1.750 | 1.875 | 1.096 | 0.2261 | 0.6514 | 20.17 | 2.021 |

TABLE 2

| | Elements | | | | | | | | | |
|---|---|---|---|---|---|---|---|---|---|---|
| | T·Fe | FeO | $Fe_2O_3$ | $SiO_2$ | CaO | MnO | $P_2O_5$ | $Al_2O_3$ | MgO | $TiO_2$ |
| content (wt %) | 15.705 | 17.180 | 3.346 | 29.6 | 28.94 | 9.186 | 3.4 | 3.28 | 3.13 | 1.18 |

As described in Tables 1 and 2, the iron dust and slag contain the valuable elements such as iron, and the iron exists to be oxidized. Therefore, the carbonaceous materials function as a reducing agent of the oxidized iron by being mixed with the iron dust.

As shown in FIG. 1, the mixture of the carbonaceous material and the waste discharged from the iron making plant is discharged toward a lower direction, that is, along a −z-axis direction by a valve 705 that regularly operates to be opened and closed. That is, the mixture of the carbonaceous material and the waste discharged from the iron making plant is supplied to the packaging device 60 that neighbors the mixture supplying device 70.

The packaging device 60 includes a conveyor 601 for transferring the package P and a packaging sealing device 603. The conveyor 601 for transferring the package supplies the mixture supplied from an upper portion thereof to the package P in order while transferring the package P along a direction indicated by an arrow. For example, the package P is made of paper that can be easily combusted. Therefore, the package P for packaging the mixture before passing the microwave oven 30 may be combusted to be eliminated by the microwaves radiated by the microwave oven 30 in a following process. For example, a cement package may be used as the package P. The mixture can be easily charged into the package P since an upper portion of the package P is opened. For example, the dimensions of the package can be 600 mm×400 mm×80 mm, and may be changed depending on an operating state. The package P in which the mixture is contained is sealed to be packaged by a package sealing device 603 while being transferred along the −x-axis direction. Therefore, the mixture does not leak outside of the package P.

A large amount of dust is generated from the mixture when the mixture is charged and heated without using the package P. The generated dust is attached to inner and outer sides of the container 10 and the cover 20. In addition, the dust can be scattered outside to be attached to inside of the microwave oven 30. To make matters worse, the microwave heats the dust attached to the inner and outer sides of the container 10 and the cover 20 and the inner surface of the microwave oven 30 while passing the container 10 through the microwave oven 30. Therefore, the heating effect of the mixture is deteriorated. On the contrary, according to an embodiment of the present invention, the dust can be suppressed from being generated and the heating effect of the microwave on the mixture can be largely increased by using the package P.

Since the microwave penetrates the package P made of a paper, the container 10, and the cover 20, the mixture is effectively heated.

As shown in FIG. 1, the package P in which the mixture is packaged falls on the conveyor 40 by way of the packaging device 60 that neighbors the conveyor 40. Therefore, the package P is supplied to the container 10 that is transferred by the conveyor 40 along the −x-axis direction. The container 10 transmits the microwaves and insulates heat. Since the container 10 has sufficient space to contain the package P, the package P is stably contained in the container 10. Particularly, the package P is laid to be contained in the container 10 in order to stably contain the package P and enhance the heating effect of the microwave oven 30.

Meanwhile, the conveyor 40 includes a pair of driving motors 401 and a conveyor belt 403. The pair of driving motors 401 are located to be spaced apart from each other. The conveyor belt 403 is driven by the pair of driving motors 401. The conveyor belt 403 transfers the container 10.

As shown in FIG. 1, an upper portion of the container 10 is covered with a cover 20 in order to suitably seal an inner portion of the container 10 since an upper portion of the container 10 in which the package P is contained is opened. That is, after a sealing device 91 grasps the cover 20, it covers the container 10 with the cover 20. Therefore, the inner portion of the container 10 in which the mixture containing the carbonaceous material and the iron dust is contained can be suitably sealed. Since the container 10 is covered with the cover 20, the container 10 is insulated for heat, and thereby the inner temperature can be highly maintained. Therefore, the metals can be easily recovered from the mixture by highly maintaining the temperature of the mixture that is heated by the microwave oven 30 and then a reducing reaction is promoted by the carbonaceous materials.

More specifically, since radiation heat generated from the mixture in a heat insulation state cannot be discharged outside, the temperature of the mixture is abruptly increased by the radiation heat. That is, the mixture can be quickly heated without using a preheating process. As a result, for example, the mixture is quickly heated to a temperature in a range of 1500° C. to 1700° C. at one time irrespective of a short heating time. Therefore, valuable elements can be easily separated from the mixture by melting them while environmentally hazardous elements can be stably fixed in the slag.

As shown in FIG. 1, the container 10 transferred on the conveyor 40 moves toward the microwave oven 30. The microwave oven 30 includes a casing 305 that separates an inner portion thereof from an outer portion thereof. The inner surface of the casing 305 can be made of a steel plate coated with an alumina fiber in order to block the microwaves radiated toward an inner side thereof from the outside thereof. An inlet door 307 and an outlet door 309 are installed at the front and rear sides of the casing 305, respectively. The inlet door 307 and an outlet door 309 are automatically opened and closed. Therefore, when the container 10 approaches the inlet door 307, the container 10 enters into the casing 305 while the inlet door 307 is opened. In addition, the container 10 to which microwaves are no longer radiated is discharged outside as the outlet door 309 is opened. Therefore, the valuable elements are contained in the mixture that is contained in the container 10 as the container 10 passes through the microwave oven 30. A double door (not shown) can be installed at an inlet port and an outlet port of the microwave oven 30 in order to prevent microwaves from leaking outside.

The microwave oven 30 includes a plurality of microwave generators 301. The plurality of microwave generators 301 are arranged side by side along the x-axis, that is, a transferring direction of the conveyor belt 403. Therefore, the plurality of microwave generators 301 continuously heat the mixture contained in the container 10. Accordingly, the heating effect of the mixture can be maximized. A low output microwave resonator is used as the microwave generator 301, and the entire microwave output can be controlled by using a plurality of low output microwave resonators. For reference, specimens in a ceramic sintered furnace with an inner effective volume of 2 m$^3$ can be heated to 1600° C. or more by using an inexpensive microwave resonator with an output of 90 kW and a frequency of 2.45 GHz. In addition, the mixture can be uniformly heated by using a plurality of microwave generators 301 since air in the microwave oven 30 is circulated by a fan 302 installed at a side surface of the microwave oven 30. A plurality of fans 302 are installed to be spaced apart from each other side by side at the side surface of the casing 305 along a transferring direction of the conveyor belt 403, that is, along the x-axis. Therefore, the mixture contained in the container 10, which moves along a transferring direction of the conveyor belt 403, is uniformly heated by circulating the air in the casing 305.

As shown in FIG. 1, the casing 305 includes a lower portion 3051 and an upper portion 3053. The lower portion 3051 is opened to be opposed to the conveyor belt 403. Therefore, the container 10 is heated by the microwaves in the casing 305 while being continuously transferred on the conveyor belt 403 without interference from the casing 305.

The upper portion 3053 opposes the lower portion 3051. A discharging port 303 is formed at the upper portion 3053. The metals vaporized from the mixture by the microwaves can be discharged outside through the discharging port 303. Meanwhile, the discharging port 303 is connected to a condenser 50. The metals discharged outside through the discharging port 303 are condensed to be recovered by cooling water flowing through the condenser 50. Therefore, the metals discharged from the mixture, for example zinc whose melting point is lower than that of iron, can be recovered by the condenser 50. When dust of an iron making plant where an electric furnace is installed is recovered and used, a portion of galvanized steel recovered from a scrapped vehicle among iron scraps used in the electric furnace is high. Therefore, iron dust can include a large amount of zinc. Since a detailed structure of the condenser 50 can be easily understood by those skilled in the art in a technical field of the present invention, a detailed description thereof is omitted.

Meanwhile, an opening device 93 grasps the cover 20 and then separates the cover from the container 10 that has passed through the microwave oven 30. Only a mixture from which the package P is removed exists in the container 10 from which the cover 20 is removed. That is, the package P is combusted to be eliminated by the microwaves generated by the microwave generator 301 while the container 10 passes through the microwave oven 30. Particularly, since the mixture is heated in the container while being maintained to be sealed at a high temperature therein, iron is united as it is melted. Then, a slag surrounds the melted iron. Therefore, since the iron is naturally separated from the slag, the iron can be easily recovered by being separated from the slag.

That is, as shown in FIG. 1, the magnetic separator 80 is located to neighbor the conveyor 40. The magnetic separator 80 recovers the valuable elements contained in the container 10. That is, the magnetic separator 80 is inserted into the container 10 along a direction indicated by the arrows and then pressure is applied toward a lower side of the container 10. Then, the metal is separated from the slag, thereby being recovered by attaching it to the magnetic separator 80. Since a detailed structure of the magnetic separator 80 can be understood by those skilled in the art in a technical field of the present invention, a detailed description thereof is omitted. In addition to the magnetic separator, various separating devices such as a cyclone can be used in order to recover the valuable elements.

Figure 2:
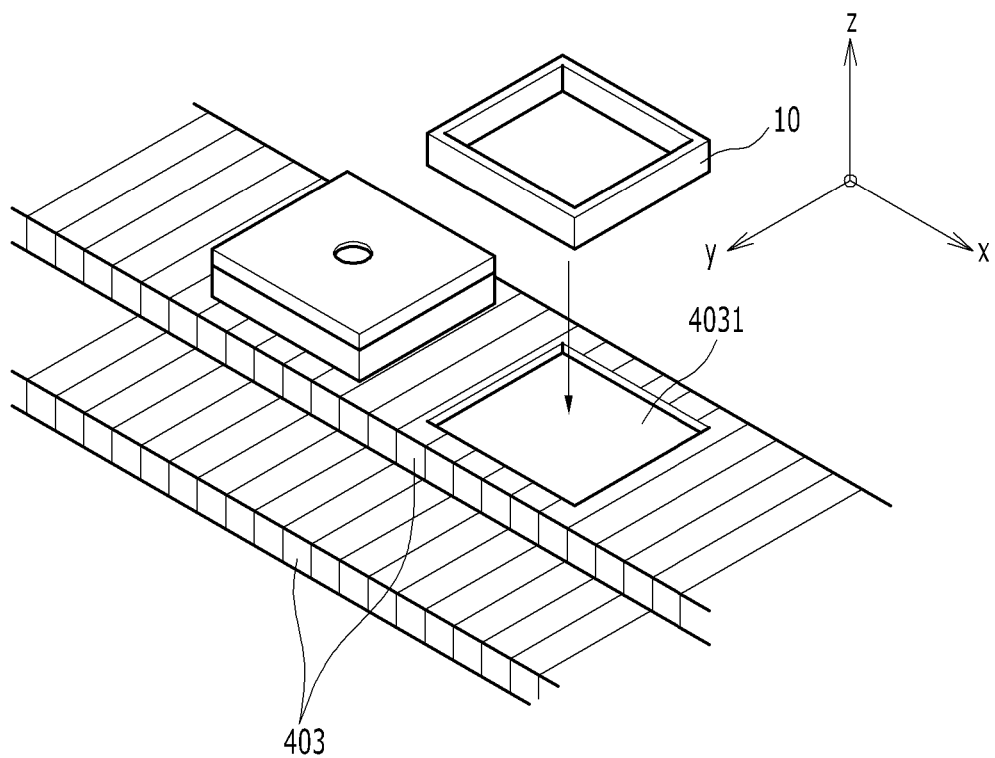
FIG. 2 is a schematic partial perspective view of the apparatus for recovering valuable elements of FIG. 1.

FIG. 2 is a partial schematic perspective view of the apparatus 100 for recovering valuable elements of FIG. 1. FIG. 2 partially enlarges the conveyor belt 403 of FIG. 1.

As shown in FIG. 2, a plurality of depressions 4031 are formed on the conveyor belt 403. The plurality of depressions 4031 are formed side by side along a transferring direction of the conveyor belt 403, that is, an x-axis direction. Therefore, as shown indicated by an arrow in FIG. 2, the container 10 is inserted to be fixed in the depression 4031, thereby being stably located on the conveyor belt 403. Therefore, there is no possibility for the container 10 to leave the conveyor belt 403 while being transferred by the conveyor belt 403.

Figure 3:
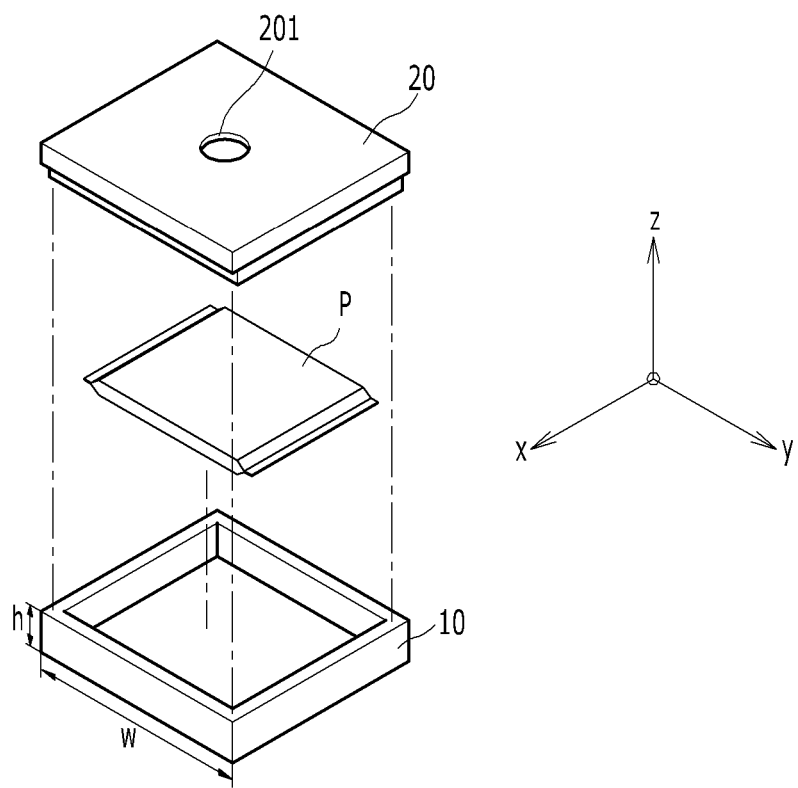
FIG. 3 is a schematic exploded view of a container and a cover of FIG. 1.

FIG. 3 schematically shows an exploded view of the container 10 and the cover 20 of FIG. 1.

As shown in FIG. 3, the package P in which the mixture is contained is covered with the cover 20 after it is contained in the container 10. The package P is laid down in order to stably contain the package P in the container 10. Therefore, the container 10 has a shape of which a width W thereof is greater than a height thereof. More specifically, a ratio of the width W of the container 10 to the height h of the container 10 can be in a range from 5 to 20. If the ratio of the height h of the container 10 to the width W thereof is too great, the package P cannot be stably contained since the height h of the container 10 is relatively high. In addition, the reaction temperature of the mixture cannot be sufficiently raised since the microwaves cannot permeate well into the container 10. On the contrary, if the ratio of the height h of the container 10 to the width W thereof is too small, it is difficult to grasp the container 10 since the height h of the container 10 is insufficient, and thereby the container 10 is completely inserted into the depression 4031 (shown in FIG. 2). Therefore, it is preferable for the ratio of the height h of the container 10 to the width W thereof to be maintained in a range as described above.

As shown in FIG. 3, an opening 201 is formed at the cover 20 covering an upper surface of the container 10. The metal vaporized from the mixture contained in the container 10 is discharged outside while the container 10 passes through the microwave oven 30 (shown in FIG. 1). Therefore, a vaporized metal discharged through the opening 201 can be easily recovered.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for recovering valuable elements comprising:
   a conveyor;
   a container configured to be moved on the conveyor, wherein the container has an open surface;
   a paper package which contains a mixture containing valuable elements, the paper package being configured to be disposed in the container and to be combusted;
   a cover that covers the open surface of the container, the cover having an opening for discharging valuable elements vaporized from the mixture;
   a microwave oven through which the container having the cover and the paper package passes, wherein the microwave oven comprises a microwave generator and a discharging opening for discharging the valuable elements vaporized from the mixture; and
   a condenser coupled to the discharge opening, wherein the condenser recovers the valuable elements vaporized from the mixture; and
   wherein the width of the container is greater than the height of the container, and
   wherein a ratio of the width of the container to the height of the container is in a range of 5 to 20.

2. The apparatus of claim 1, further comprising a packaging device that neighbors the conveyor and is configured to package the mixture in the paper package and to supply the paper package containing the mixture to the container.

3. The apparatus of claim 1, further comprising a mixture supplying device configured to supply the mixture to a packing device.

4. The apparatus of claim 1, wherein the microwave oven further comprises:
   a plurality of fans spaced apart from each other along a transferring direction of the conveyor.

5. The apparatus of claim 1, wherein the conveyor comprises:
   a pair of driving motors that are spaced apart from each other; and
   a conveyor belt driven by the pair of the driving motors and is configured to move the container,
   wherein a plurality of depressions are formed on the conveyor belt side by side along a transferring direction of the conveyor belt, wherein the container is configured to be inserted into one of the plurality of depressions.

6. The apparatus of claim 1, further comprising:
   a magnetic separator that neighbors the conveyor, wherein the magnetic separator is configured to recover valuable elements contained in the container after the container passes through the microwave oven.

7. The apparatus of claim 1, wherein the valuable elements are selected from the group consisting of zinc, iron, and phosphor.

* * * * *